H. F. BENNER.
SUPPLEMENTARY SPRING FOR VEHICLES.
APPLICATION FILED JAN. 30, 1917.

1,236,042.  Patented Aug. 7, 1917.

H. F. Benner,
Inventor

By Geo. P. Kimmel
Attorney

UNITED STATES PATENT OFFICE.

HARVEY F. BENNER, OF KENTON, OHIO.

SUPPLEMENTARY SPRING FOR VEHICLES.

1,236,042.

Specification of Letters Patent.

Patented Aug. 7, 1917.

Application filed January 30, 1917. Serial No. 145,465.

*To all whom it may concern:*

Be it known that I, HARVEY F. BENNER, a citizen of the United States, and resident of Kenton, in the county of Hardin and State of Ohio, have invented certain new and useful Improvements in Supplementary Springs for Vehicles, of which the following is a specification.

This invention relates to new and useful improvements in supplementary springs adapted to be applied to vehicles employing a transverse spring, which will aid in the carrying of extra loads, and in the distribution of weight on the rear axle and vehicle spring, out near the wheels.

A further object of the invention is to provide a supplementary spring of this character which is adapted to form a resistance element between the vehicle body and main springs which is adapted to double the capacity or weight carried by the car without bumping the rear axle. This supplementary spring will prevent the vehicle from leaning sidewise by holding the load erect at all times, and also doing away with the sheering off of the center bolt which is liable to occur when an undue load is placed on the vehicle. The use of this type of supplementary spring does away with the necessity of putting extra leaves on the main spring when an abnormally heavy load is desired to be carried.

Another object of the invention is to provide a device of this character which is easily and simply constructed, inexpensive to manufacture, and one which will be very efficient in operation.

With these and numerous other objects in view my invention consists of the novel features of construction, combination and arrangements of parts which will be herein referred to and more particularly pointed out in the specification and claim.

Referring to the drawings which form a part of this invention,

Figure 1:
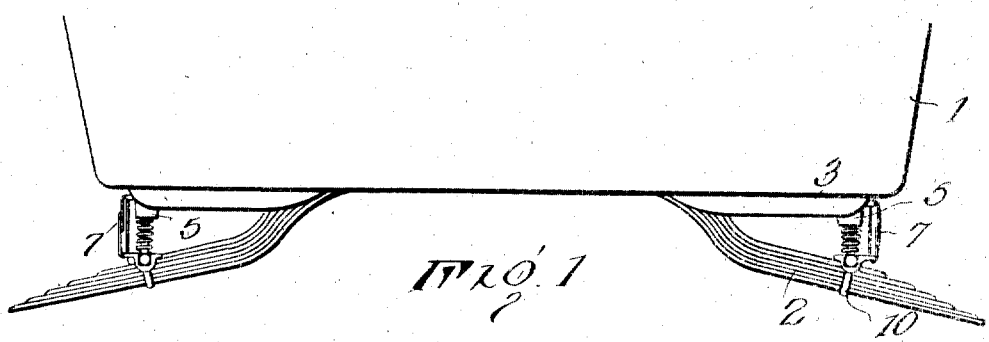
Figure 1 is a rear elevation of the vehicle body showing the application of my supplementary spring thereto.

In describing my invention I shall refer to the drawings with similar reference characters designating corresponding parts throughout the several views. The numeral 1 designates the vehicle body, which has disposed transversely beneath the same the usual type of main spring 2, such as is commonly applied to vehicles of this character.

Figure 2:
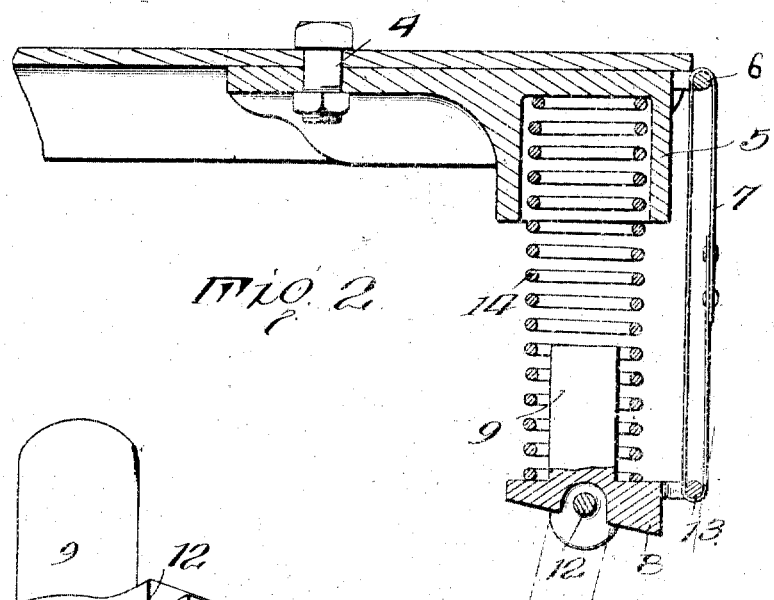
Fig. 2 is a vertical section taken through the attachment.
Figure 3:
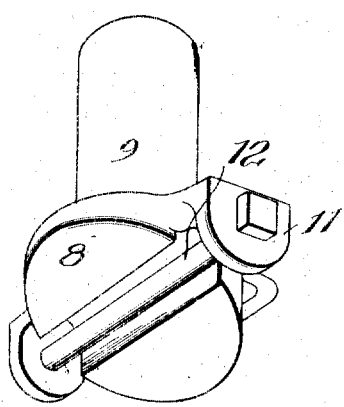
Fig. 3 is a detail perspective view of the bearing block as affixed to the transverse spring.

My invention is applied in pairs, one on each side of the vehicle, but for the sake of brevity I shall only specifically describe but one of these devices. The numeral 3 designates a socket member which is secured to the bottom of the vehicle body 1 by any type of fastening means preferably a bolt 4 as clearly shown in Fig. 2 of the drawings. This socket member 3 is provided with downwardly projecting portions disposed directly above the main spring 2 and which has formed therein a socket 5. Secured to one side of the member 3 is a laterally projecting U-shaped integral bar 6 for a purpose to be hereinafter more fully described.

Secured to the main spring 2 directly beneath the member 3 is a bearing block 8 which has on its upper surface an upwardly projecting stud 9 disposed in vertical alinement with the socket 5. This bearing block 8 is held in position on the spring 2 by means of a clip 10 which is substantially U-shaped and extends across the bottom of the spring and has upwardly bent ends positioned adjacent the opposite sides of said spring and held in position between downwardly turned ears 11 on opposite sides of the bearing block by means of a transversely extending fastening bar 12, that is positioned in a transversely extending groove in the bottom surface of said block. If desired, the face of the spring on which the block rests may also be provided with a transverse coacting groove. This block is also provided with an attaching rod 13 which is similarly constructed to the rod 6 on the socket member 3 and which is disposed in vertical alinement with the same. Interposed between the block 8 and socket member 3 is a coil spring 14 which has its upper end positioned within the socket 5 in the member 3, while the lower end of the coil spring bears against the block 8 and surrounds the stud 9. To additionally hold the coil spring 14 in position I have provided a strap 7 which may be adjustable and which is positioned over the connecting rods 13 and 6 of the block and socket members, and which is adapted to limit the outward movement between these parts whereupon they cannot be moved away from each other a sufficient distance to enable the coil springs to drop from position.

The operation of a supplementary spring of this character is obvious, and it will be seen that I have provided a very simple type of resistance element that is adapted to be interposed between the vehicle body and main spring, and which will take up all undue shocks and jars incidental to the operation of the vehicle. This spring is easily attached or detached from the vehicle and owing to its extreme simplicity of construction is very economically manufactured.

From the foregoing description and the construction and operation of my new and improved type of supplementary spring, the manner of applying the same to use and the operation thereof will be readily understood and it will be seen that I have provided a simple and efficient means to carry out the objects of this invention.

What I claim as my invention and desire to secure by Letters Patent, is:

The combination with a vehicle, a transversely extending main supporting spring, of auxiliary supporting units interposed between the vehicle and said spring, each unit comprising a coil expansion spring; a socket member secured to the vehicle and adapted to receive one end of said coil spring, a bearing block having its lower surface snugly engaging the main spring and secured thereto, a projecting stud on the upper surface of said block over which the other end of said coil spring is positioned, substantially U-shaped retaining arms projecting from one side of the member and block and disposed in alinement, and a strap trained over said arms and connecting said member and block to limit the outward movement between said parts whereby the coil spring will be held securely in position.

In testimony whereof, I affix my signature hereto.

HARVEY F. BENNER.